US006719930B2

United States Patent
Chen et al.

(10) Patent No.: US 6,719,930 B2
(45) Date of Patent: Apr. 13, 2004

(54) LIGHT GUIDE AND STAMPER PRODUCTION METHOD

(75) Inventors: Shih-Chou Chen, Hsinchu (TW); Chung-Kuang Hsieh, Feng-Yuan (TW); Chih-Han Fang, Hsinchu Hsien (TW); Yuh-Sheng Lin, Hsinchu (TW)

(73) Assignee: Litek Opto-Electronics Co., Ltd., Hsinchu Hsien (TW)

( * ) Notice: Subject to any disclaimer, the term of this patent is extended or adjusted under 35 U.S.C. 154(b) by 275 days.

(21) Appl. No.: 09/912,465

(22) Filed: Jul. 24, 2001

(65) Prior Publication Data

US 2003/0020189 A1 Jan. 30, 2003

(51) Int. Cl.$^7$ .............................................. B29D 11/00
(52) U.S. Cl. ............................ 264/2.5; 205/70; 216/24; 264/1.24; 264/408
(58) Field of Search ................................ 264/1.37, 1.38, 264/2.5, 408, 409, 1.24, 1.34, 40.1; 430/5, 6; 216/24, 26; 205/70

(56) References Cited

U.S. PATENT DOCUMENTS 5,776,636 A * 7/1998 Kunisawa et al.

* cited by examiner

Primary Examiner—Mathieu D. Vargot
(74) Attorney, Agent, or Firm—Pro-Techtor International Services (57) ABSTRACT

A production method of a light guide and a stamper, combining anisotropic etching and isotropic etching. First a plurality of microstructures is formed on a back surface and a front surface of the substrate. By electroforming, rear and front stampers are made from the back and front surfaces of the substrate. Light guides are produced using the rear and front stampers. Anisotropic etching is performed on the front surface of the substrate, forming V-shaped, U-shaped or pyramid like microstructures. Isotropic etching is performed on the back surface of the substrate, forming quadratic, bowl like, oval or semicircular microstructures. If a transparent substrate is used, then after finishing the etching of microstructures, a light source, a reflector, a diffusion sheet and a prism sheet are added, simulating a back light module for performing a test of luminosity, uniformity of light intensity and light emission angle, so that optical properties are known before proceeding with inverse-forming of the stampers.

10 Claims, 8 Drawing Sheets

LIGHT GUIDE AND STAMPER PRODUCTION METHOD

BACKGROUND OF THE INVENTION

1. Field of the Invention

The present invention relates to a light guide and stamper production method, particularly to a method for producing a light guide and a stamper, with the light guide to be used in a back light module of a liquid crystal display (LCD) panel.

2. Description of Related Art

Figure 3A:
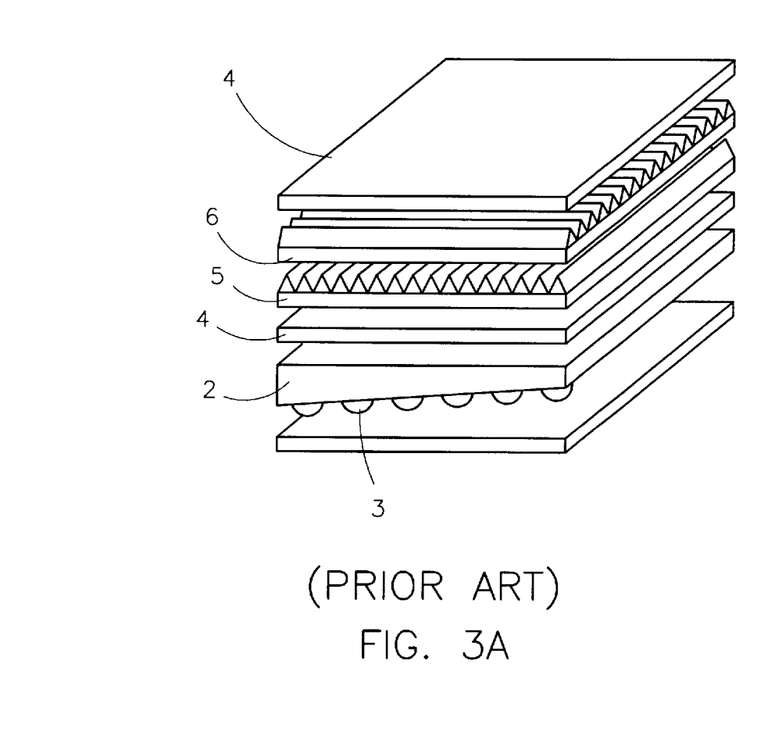
FIGS. 3A and 3B are views of conventional LCD back light module.
Figure 3B:
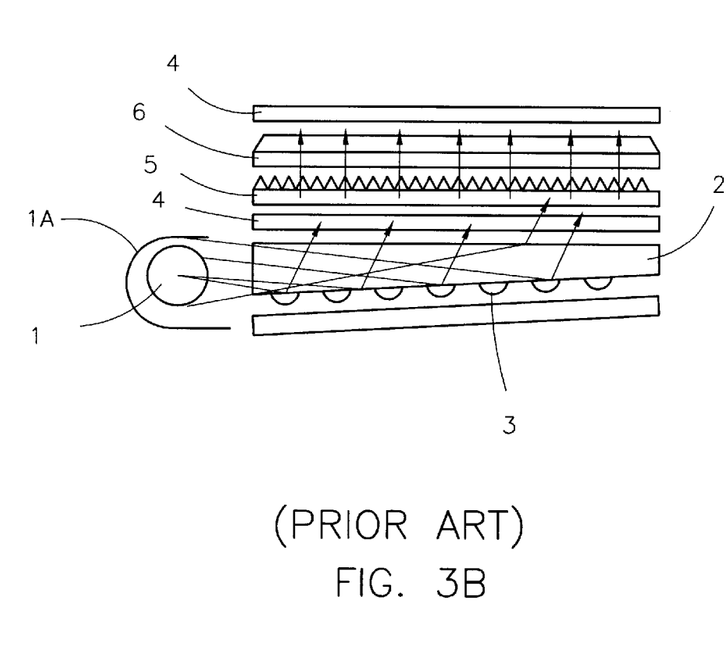

Flat displays which do not emit light, like liquid crystal display (LCD) panels, are illuminated by flat light module. A light transmitting LCD panel is illuminated by a back light module, whereas a light reflecting LCD panel is illuminated by a front light module. The back light module has a linear light source, e.g. a cold cathode tube, or a point-like light source, e.g. a light emitting diode (LED), forming a simple lighting assembly of high intensity and uniform spatial intensity distribution. As shown in FIGS. 3A and 3B, a conventional back light module has a cold cathode tube 1, which is attached to one end of a light guide 2. Light from the cold cathode tube 1 is by a reflector 1A reflected onto the light guide 2. Inside the light guide 2, primary light propagates along a main direction, parallel to front and back surfaces of the light guide 2, with little attenuation and, due to total reflection, without exiting through the front and back surfaces. Microstructures 3 that are densely arranged on the back surface of the light guide 2 when hit by rays of the primary light deflect these as secondary light towards the front surface. The secondary light is no longer totally reflected, but rather passes through the front surface. This decreases the intensity of the primary light within the light guide not yet deflected by microstructures 3. For this reason, the microstructures 3 are arranged close to the light source 1 at a low a real density and, proceeding away from the light source 1, with increasing a real density, so that the secondary light emanating front the front surface of the light guide 2 has a uniform spatial intensity distribution. A rear diffusion sheet 4 covers the front surface of the light guide 2 spreads the secondary light to a widened range of emission angles and smoothes out any image of the microstructures 3. A rear prism sheet 5 and a front prism sheet 6 are laid on the rear diffusion sheet 4. The rear prism sheet 5 and the front prism sheet 6 are transparent plates, each carrying parallel rows of V-shaped projections, with the V-shaped projections of the rear prism sheet 5 oriented perpendicular to the V-shaped projections of the front prism sheet 6. Thereby the angular distribution of the secondary light is concentrated around a direction normal to the front surface, increasing intensity and observation angle. Finally, a front diffusion sheet is laid on the front prism sheet 6, smoothing out images of the rear and front prism sheets 5, 6.

The microstructures 3 on the back surface of the light guide 2 have quadratic, bowl like, oval or semicircular shapes for adjusting uniformity of the secondary light and have sizes ranging from centimeters to microns. The smaller the sizes of the microstructures 3, the more accurately uniformity of the secondary light is adjustable, so that impairing of imaging quality is avoided. Other embodiments of the light guide 2 are possible. For instance, the front surface of the light guide 2 alternatively has mirrors, or, in another variation has microstructures which are V-shaped grooves substituted for one of the prism sheets, so that a combined optical structure is formed, having the same optical characteristics as the conventional front surface of the light guide 2 and the front prism sheet 6, allowing to dispense with one of the prism sheets. Alternatively, pyramid like microstructures are set on the front surface of the light guide 2, having the same optical characteristics as the conventional front surface of the light guide 2 and the rear and front prism sheets 5, 6, allowing to dispense with both of the prism sheets 5, 6. However, in both embodiments, inclinations and angles have to be set precisely, so that high variability and a high standard of size precision of the microstructures are required.

Microstructures on conventional light guides are manufactured by the following methods: 1. Matrix printing, putting dye or resin on the surface of the light guide. This method, however, is limited to matrix sizes of more than 300 microns, and stability and variability of shapes of microstructures are insufficient. 2. Sand-blasting and etching, using a metal plate as a mold, forming the light guide by electroforming, and injection molding or hot embossing. This does not provide for well-defined shapes of microstructures, nor is there any variability of microstructures. 3. Mechanical working, making a mold using a diamond cutting tool, making a stamper by electroforming, then forming the light guide by plastic injection molding or hot embossing using the stamper. Although this method allows to control size and shape of the microstructures, there is no variability of microstructures. Due to the size of the cutting tool, microstructures cannot be made smaller than several tens of microns. Inaccuracy of mechanical working as well as wear on the cutting tool results in shapes of microstructures that are not precisely reproduced. 4. Photoresist light-engraving, as taught in U.S. Pat. No. 5, 776, 636. Coating with a photoresist layer, exposure to light and developing, so that the microstructures are fixed, then making a stamper by electroforming, and producing the light guide by plastic injection molding or hot embossing using the stamper.

Since the shape and size of the microstructures determine optical characteristics thereof, demand on precision is high. Therefore, during a development stage repeated tests are required to obtain a satisfying effect. However, since conventional methods all use a mold, testing is possible only after injection molding or hot embossing. Thus, when a light guide is developed, using the methods described above, a sample has to be produced and then optically tested. This has to be repeated, until the tests are successful. Furthermore, the precision of heights of the microstructures on the light guide depends on the thickness of the photoresist layer, affecting precision of size of the microstructures on the light guide. There is also a limited variability of the microstructures on the light guide.

There are two ways of etching of microstructures, isotropic etching and anisotropic etching. If etching proceeds with equal speeds in all directions (x-, y-, z-axis), isotropic etching is done. By varying components of a liquid etching agent, temperature and stirring, isotropic etching produces various shapes of microstructures, like quadratic, bowl like, oval or semicircular shapes.

Anisotropic etching proceeds with different velocities in anisotropic structures of single crystal materials, thus creating certain etched shapes, e.g. V-shaped, U-shaped or pyramid like microstructures. For performing anisotropic etching, the substrate is a single crystal, like silicon, quartz, GaAs or $LiNbO_3$. Growing of a mask thin film, coating by a photoresist layer, light exposure and etching masked by the mask thin film are performed. Due to the single-crystal structure of the substrate, etching proceeds anisotropically, and certain shapes are possible, like V-shaped, U-shaped or pyramid like microstructures. For example, a<100> silicon wafer is used as a substrate, a $SiO_2$ layer is deposited thereon, a photoresist pattern is coated, exposed, developed thereon, then by HF etching the $SiO_2$ layer is etched and the photoresist layer is removed. The remaining $SiO_2$ pattern serves as a mask for anisotropic etching. Anisotropic etching is then performed for silicon using liquid KOH, NaOH, ethylene-diamine pyrocatechol or $N_2H_4$. Due to the single-crystal structure of the substrate, etching proceeds anisotropically, and certain facets are etched away, forming V-shaped, U-shaped or pyramid like microstructures.

SUMMARY OF THE INVENTION

The main object of the present invention is to provide a novel light guide and stamper production method which mainly uses light exposure and combined anisotropic and isotropic etching for forming microstructures on a substrate and producing light guides by electroforming. A front stamper for front surfaces of the light guides is made by anisotropic etching, having V-shaped, U-shaped or pyramid like microstructures. Having made the front stamper, the front surfaces of the light guides are readily formed, having V-shaped, U-shaped or pyramid like microstructures, which have well-defined inclinations, so that the front surfaces are brighter and emit light at controlled angles. A rear stamper for back surfaces of the light guides is made by isotropic etching, for forming microstructures with quadratic, bowl like, oval or semicircular shapes. Having made the rear stamper, the back surfaces of the light guides are readily formed, having quadratic, bowl like, oval or semicircular shapes and deflecting light, while being arranged at varying densities, so as to achieve uniform intensity of deflected light, which in turn results in light being emitted uniformly by the front surface. By combining the front and rear stampers for forming the light guides, the back surfaces thereof are shaped like the rear stamper, having quadratic, bowl like, oval or semicircular microstructures, whereas the front surfaces thereof are shaped like the front stamper, having V-shaped, U-shaped or pyramid like microstructures. If the front surfaces of the light guides have V-shaped microstructures, the shape thereof is the same as the shape of conventional planar front surfaces with one prism sheet added, and one prism sheet can be dispensed with. If the front surfaces of the light guides have pyramid like microstructures, the shape thereof is the same as the shape of conventional planar front surfaces with two prism sheets added, and two prism sheets can be dispensed with. This leads to a smaller number of structural parts, resulting in higher quality and lower cost.

Another object of the present invention is to provide a novel testing method for developing light guides which uses combined anisotropic and isotropic etching of a single-crystal, transparent substrate, wherein the front surface thereof is anisotropically etched, forming V-shaped, U-shaped or pyramid like microstructures, and the back surface thereof is isotropically etched, forming quadratic, bowl like, oval or semicircular microstructures. After etching of the transparent substrate, by plastic injection molding a transparent body with the same microstructures is formed, simulating a back light module equipped with a light guide, a reflection sheet, a diffusion sheet or a prism sheet. This allows to conduct tests of light intensity and uniformity without having to make a stamper and molding a light guide. Having finished the optical tests, the stamper is electroformed and light guides are molded. This saves the effort of making light guides by printing, etching or molding from a stamper before optical testing, thus saving time and cost.

The present invention can be more fully understood by reference to the following description and accompanying drawings.

DETAILED DESCRIPTION OF THE PREFERRED EMBODIMENTS

Figure 1:
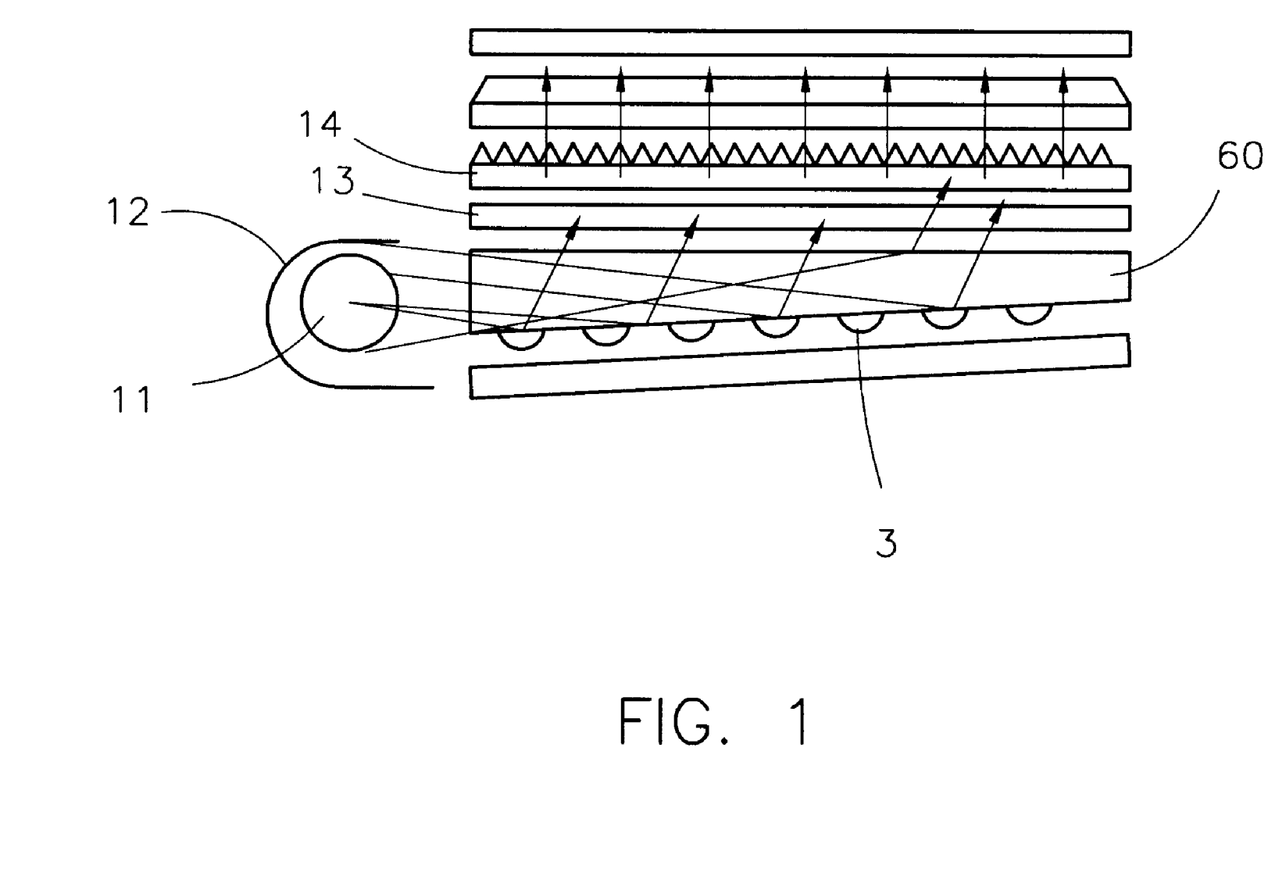
FIG. 1 is a schematic illustration of optical testing on a transparent substrate using the method of the present invention in the first embodiment.
Figure 2A:
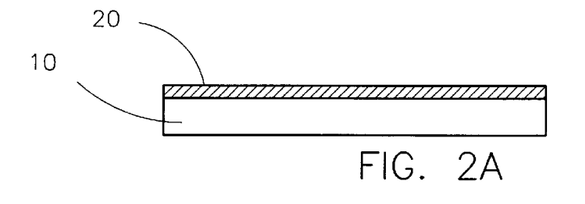
FIGS. 2A–2H are schematic illustrations of the process of the method of the present invention in the first embodiment.
Figure 2B:
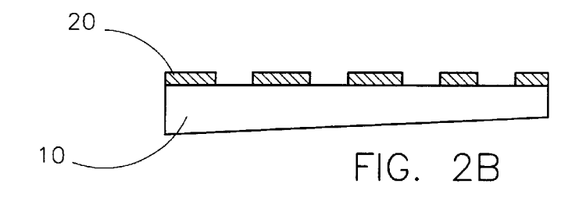
Figure 2C:
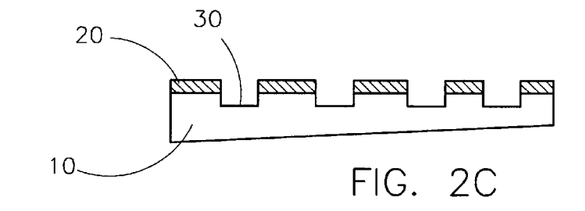
Figure 2D:
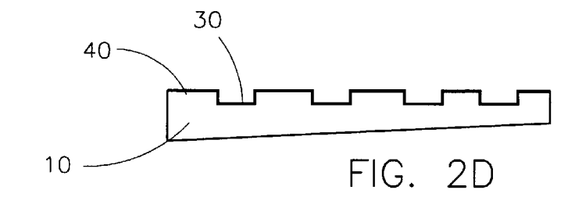
Figure 2E:
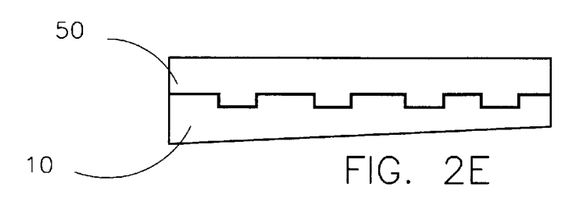
Figure 2F:
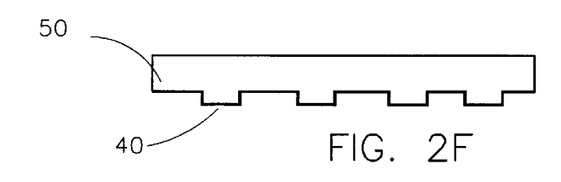
Figure 2G:
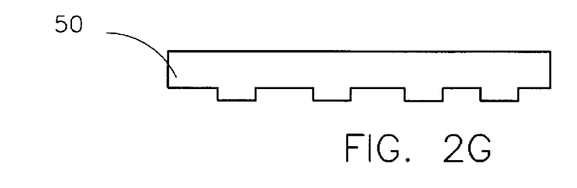
Figure 2H:
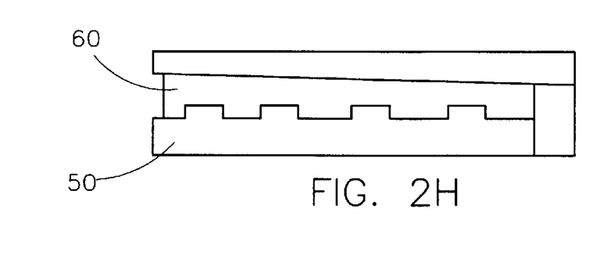

As shown in FIGS. 2A–2H, the light guide and stamper production method of the present invention in the first embodiment mainly comprises the following steps: First a transparent glass substrate 10 is on a back surface thereof coated with a photoresist layer 20. After exposure to light, HF etching is performed on the glass substrate 10, as shown in FIG. 2C, creating microstructures 30 which are depressions of varying spatial density. Etching is isotropic, and by varying components of a liquid etching agent, temperature and stirring, various shapes of microstructures are produced. The etched glass substrate 10 is then usable as a light guide, as shown in FIG. 1, to which a light source 11, a reflector 12 a diffusion sheet 13 and a prism sheet 14 are added for performing a luminosity, uniformity and emission angle test. The results of the test are applied to another design of shapes and density of microstructures. Exposure to light and etching are done again, and the process is repeated until luminosity and emission angle are according to demand. The back surface of the glass substrate 10 thus finished has shapes and distribution of microstructures as required. As shown in FIG. 2D, a metal seed layer 40 is placed on the glass substrate 10. The seed layer 40 is made of Ni, Cu or Ag. As shown in FIG. 2E, a stamper 50 is made by electroforming. Materials for electroforming are Ni, NiCo alloy, NiFe alloy, or SiC containing Ni. Then, as shown in FIG. 2F, the stamper 50 is separated from the glass substrate 10 and, as shown in FIG. 2G, the seed layer is etched off, so that the stamper 50 is finished.

The shapes and density of the microstructures on the glass substrate 10 are copied onto light guides. First the stamper 50 is formed, then the light guides are formed using the stamper 50. Thus the back surface of the light guides have microstructures the shapes and density of which are copied from the glass substrate 10. Back lighting assemblies are made by adding light sources, reflectors, diffusion sheets and prism sheets, in the same way as the light source 11, the reflector 12 the diffusion sheet 13 and the prism sheet 14 have been added to the glass substrate 10, so that luminosities and emission angles of the light guides are as required. By first creating microstructures on the glass substrate 10, testing, and only then electroforming and making the light guides, the process of developing a light guide is simplified, and the disadvantage of conventional art, testing only after having made molds, electroformed stampers and formed light guides, is avoided, so that significant time and cost are saved.

Referring to FIGS. 4A–4J, in a second embodiment of the present invention, V-shaped, U-shaped or pyramid like microstructures on front surfaces of light guides are created. By anisotropic etching, V-shaped, U-shaped or pyramid like microstructures are etched into a front surface of a substrate, and a stamper is used to create V-shaped, U-shaped or pyramid like microstructures on the front surfaces of the light guides.

Figures 4A, 4B:
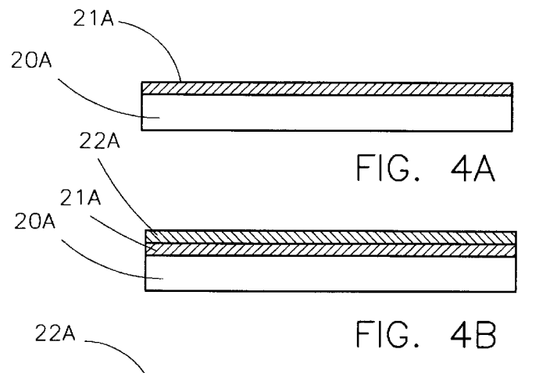
FIGS. 4A–4J are schematic illustrations of the process of the method of the present invention in the second embodiment.
Figure 4C:
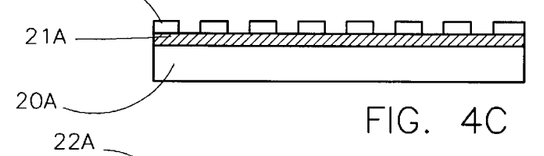
Figure 4D:
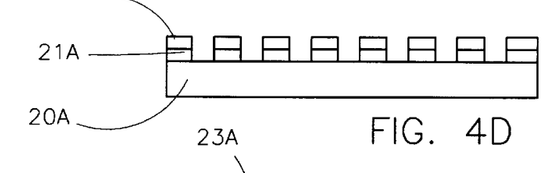
Figure 4E:
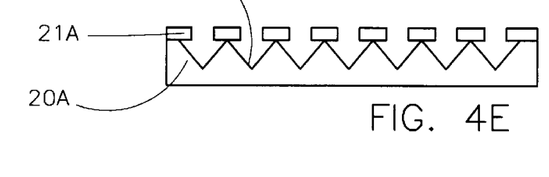
Figures 4F, 4G, 4H:
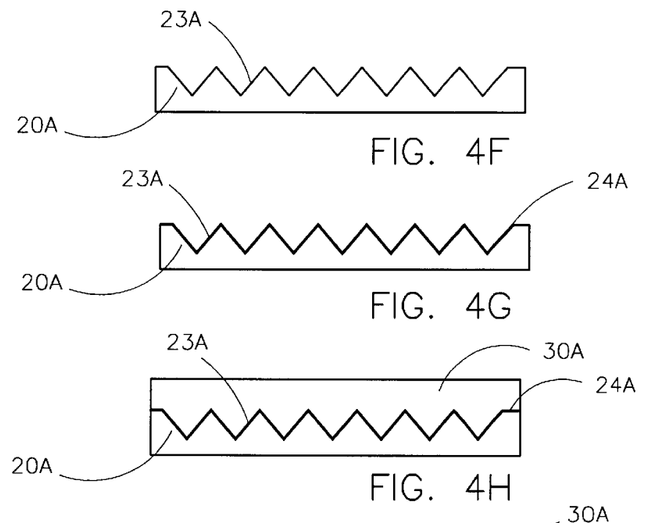
Figure 4I:
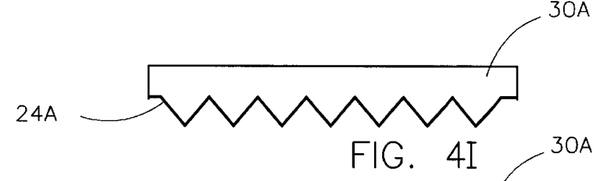
Figure 4J:
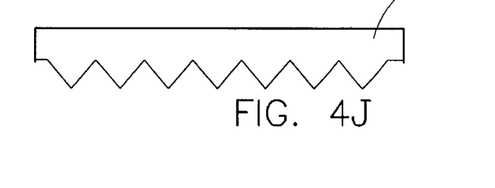

This process is done as follows: As shown in FIG. 4A, a $SiO_2$ layer 21A is grown on a single crystal 20A and coated by a photoresist layer 22A, as shown in FIG. 4B. As shown in FIG. 4C, by exposure to light and developing the photoresist layer 22A forms a pattern. As shown in FIG. 4D, after etching away the exposed parts of the $SiO_2$ layer 21A by a liquid etching agent, the photoresist layer 22A is removed. Then, as shown in FIG. 4E, using the remaining parts of the $SiO_2$ layer 21A as a mask, etching is performed on the single crystal 20A, which leads to forming of V-shaped, U-shaped or pyramid like microstructures 23A. As shown in FIG. 4F, the remaining parts of the $SiO_2$ layer 21A are removed and, as shown in FIG. 4G, a seed layer 24A is planted on the single crystal 20A. Finally, as shown in FIGS. 4H–4J, a stamper 30A is made on the single crystal 20A, then separated therefrom, and, after removing the seed layer 24A, using the stamper 30A light guides are formed, having microstructures on front surfaces thereof.

The method of the present invention in the second embodiment is mainly characterized in that the stamper for producing the light guides has V-shaped, U-shaped or pyramid like microstructures which are made by etching. Thus higher precision of sizes and shapes is achieved, as compared to conventional art. In conventional art, V-shaped, U-shaped or pyramid like microstructures are made mechanically, by flying cutting, which implies size limitations, not allowing for minute sizes, and is subject to wear of cutting tools, so insufficient precision of sizes and shapes is achieved. The present invention in the second embodiment, on the other hand, overcomes the limitations of mechanical cutting, achieving high accuracy and precision of sizes and shapes.

The first and second embodiments of the present invention are combinable or usable separately. In separate use, first a transparent substrate having a back surface with microstructures is made by the method of isotropic etching of the first embodiment. Having performed optical tests thereon, a substrate having a front surface with V-shaped, U-shaped or pyramid like microstructures is made by the method of anisotropic etching of the second embodiment. The two substrates thus made are used to form a rear stamper and a front stamper, which in turn are used to make light guides.

Figure 5:
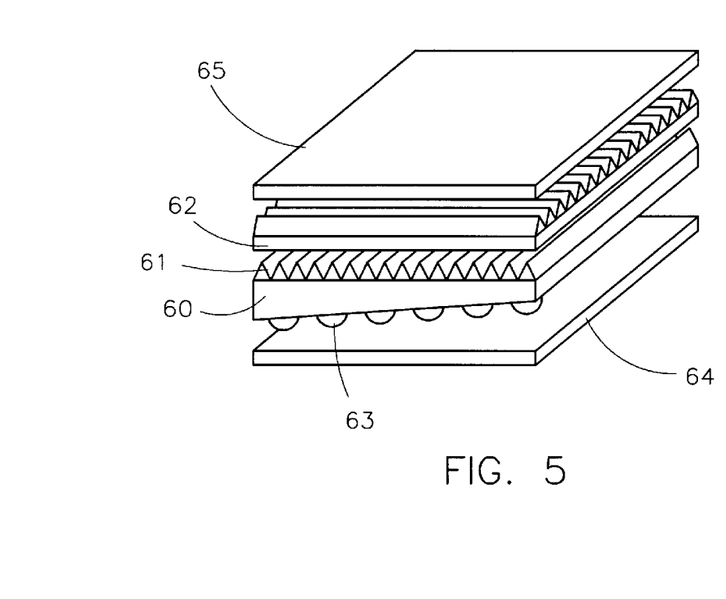
FIGS. 5 and 6 are perspective views of LCD back lighting assemblies produced using the method of the present invention in the first and second embodiments.
Figure 6:
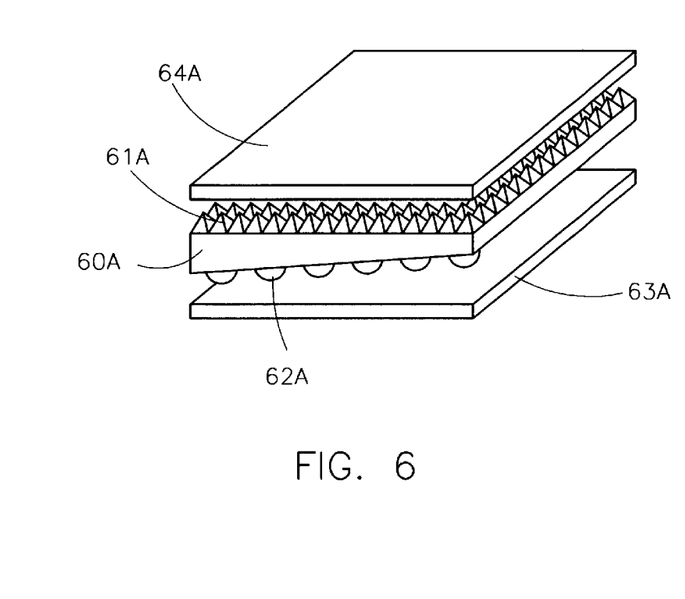

Referring to FIG. 5, the back light module made by the methods of the first and second embodiments of the present invention using the rear and front stampers comprises: a light guide 60, having front and back surfaces; a reflection sheet 64 on the back surface of the light guide 60; a prism sheet 62; and a diffusion sheet 65. The back surface of the light guide 60 has quadratic, bowl like, oval or semicircular microstructures 63, and the front surface thereof has V-shaped or U-shaped microstructures 61. The prism sheet 62 has V-shaped grooves which are oriented perpendicular to the microstructures 61. As shown in FIG. 6, a light guide 60A, made by the method of the present invention, has a front surface with pyramid like microstructures 61A and a back surface with semicircular, bowl like or oval microstructures 62A. The pyramid like microstructures 61A are a substitute for two prism sheets, allowing to dispense with any prism sheet. A reflection sheet 63A and a diffusion sheet are added to complete a back light module.

Furthermore, the first and second embodiments of the present invention are combinable, using a single substrate with back and front surfaces. By isotropic etching on the back surface, quadratic, bowl like, oval or semicircular microstructures are formed, and by anisotropic etching on the front surface, V-shaped, U-shaped or pyramid like microstructures are formed. Then rear and front stampers are made separately at the back and front surfaces. Referring to FIGS. 7A–7G, the present invention in a third embodiment combines the methods of the first and second embodiments, using exposure to light, developing and anisotropic as well as isotropic etching on a single-crystal transparent substrate. On the back surface of the transparent substrate, quadratic, bowl like, oval or semicircular microstructures are formed, and on the front surface thereof, V-shaped, U-shaped or pyramid like microstructures are formed, so that the microstructures on the back and front surfaces are formed on a single substrate.

Figure 7A:
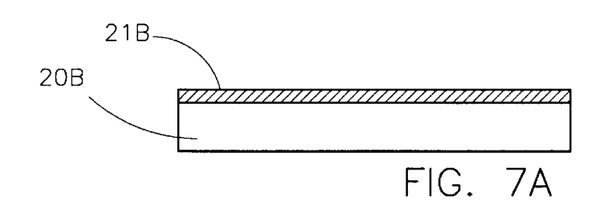
FIGS. 7A–7G are schematic illustrations of the process of the method of the present invention in the third embodiment.
Figure 7B:
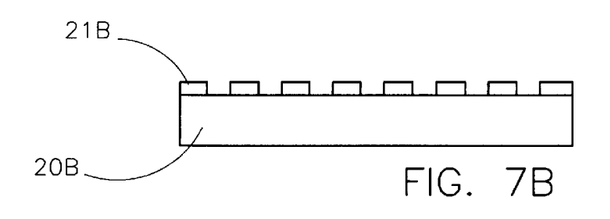
Figure 7C:
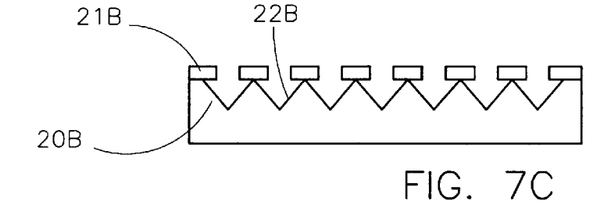
Figure 7D:
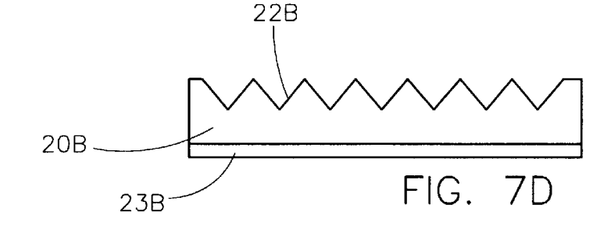
Figure 7E:
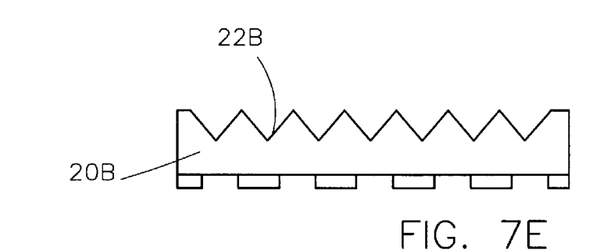
Figure 7F:
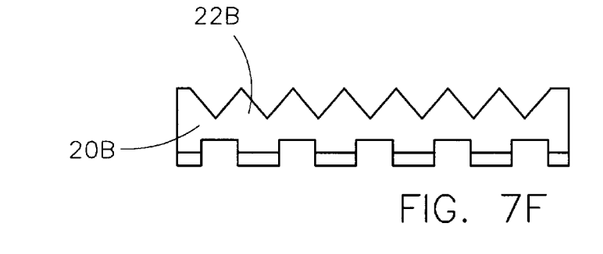
Figure 7G:
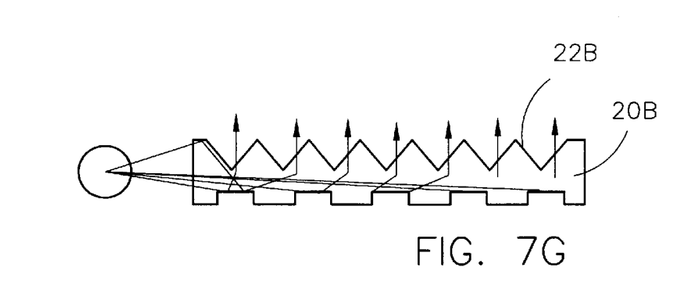
Figure 8A:
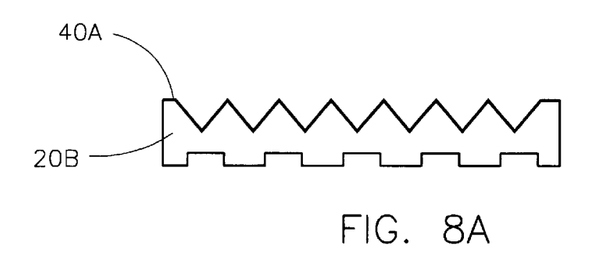
FIGS. 8A–8D are schematic illustrations of the process of the method for producing the front stamper of the present invention in the third embodiment.
Figure 8B:
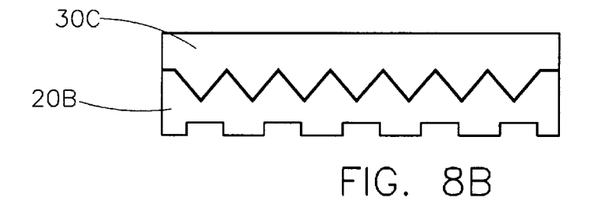
Figure 8C:
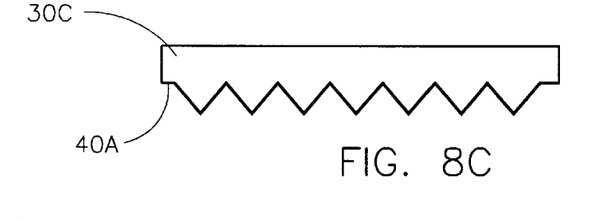
Figure 8D:
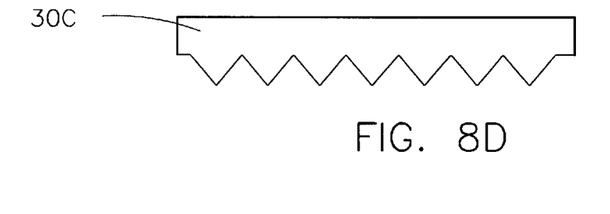
Figure 9A:
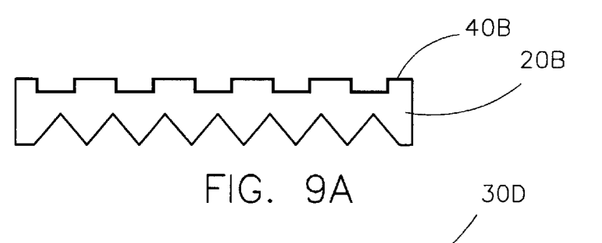
FIGS. 9A–9D are schematic illustrations of the process of the method for producing the rear stamper of the present invention in the third embodiment.
Figures 9B, 9C:
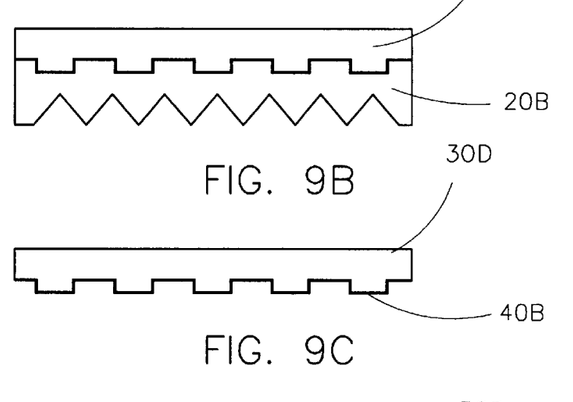
Figure 9D:
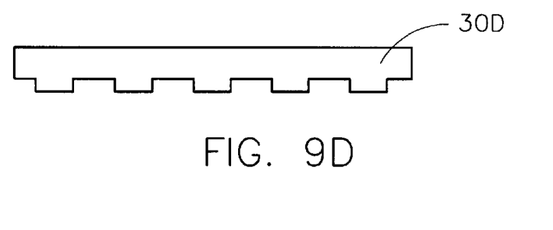

First, as shown in FIG. 7A, a front surface of a single-crystal transparent substrate 20B is coated with a photoresist layer 21B, exposed to light and developed, as shown in FIG. 7B. Using an anisotropic liquid etching agent, V-shaped, U-shaped or pyramid like microstructures 22B are formed, as shown in FIG. 7C. Then a back surface of the single-crystal transparent substrate 20B (e.g. quartz) is coated with a photoresist layer 23B, exposed to light and developed, as shown in FIG. 7D. Using an isotropic liquid etching agent, quadratic, bowl like, oval or semicircular microstructures 24B are formed, as shown in FIG. 7E. Referring to FIG. 7G, having finished etching the glass substrate is usable as a light guide in conjunction with a light source, a reflecting sheet, a diffusion sheet and a prism sheet to simulate a back light module. At first, a test of luminosity and uniformity is performed, the result of which serve to redesign shapes and density of the microstructures. Light exposure, developing and etching are repeated until a luminosity distribution as required is achieved. Then the transparent glass substrate has microstructures of shapes and density that are required for light guides to be produced.

Figure 10:
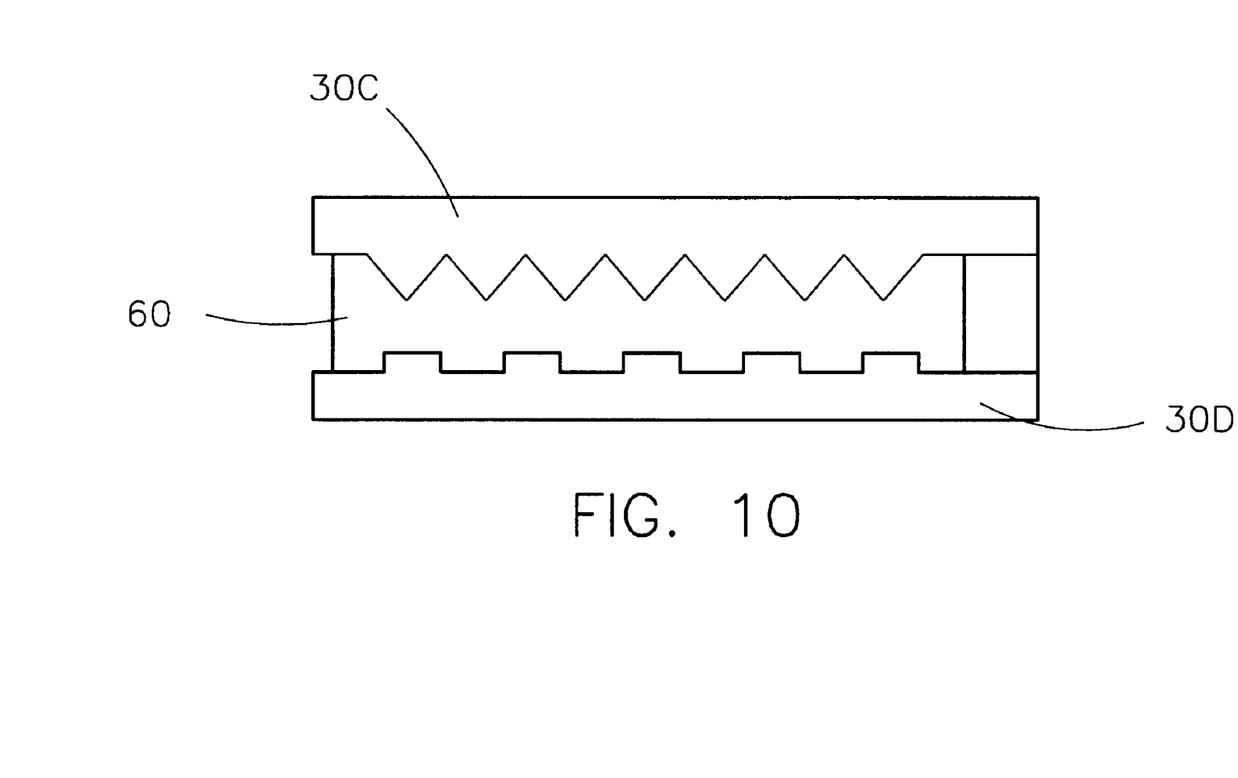
FIG. 10 is a schematic illustration of molding of a light guide using the front and the rear stampers produced using the method of the present invention in the third embodiment.

Referring to FIGS. 8A–8D, a seed layer 40A is grown on the front surface of the finished substrate 20B. After this, a front stamper 30C is made by electroforming and then separated, and the seed layer 40A is removed. Following this, as shown in FIGS. 9A–9D, a seed layer 40B is grown on the back surface of the finished substrate 20B. After this, a rear stamper 30D is made by electroforming and then separated, and the seed layer 40B is removed. As shown in FIG. 10, light guides are formed by plastic molding or hot embossing using the front and rear stampers 30C, 30D.

The produced light guides have back surfaces with quadratic, bowl like, oval or semicircular microstructures that are the same as the microstructures on the back surface of the transparent substrate, and have front surfaces with V-shaped, U-shaped or pyramid like that are the same as the microstructures on the front surface of the transparent substrate. If V-shaped microstructures have been formed on the front surfaces, then optical properties thereof are equal to a conventional mirror with a single prism sheet. Thus one prism sheet can be dispensed with. If pyramid like microstructures have been formed on the front surfaces, then optical properties thereof are equal to a conventional mirror with two prism sheets. Thus two prism sheets can be dispensed with. Therefore the present invention significantly saves time, ensures a simplified and compact structure, increases quality and saves cost.

While the invention has been described with reference to preferred embodiments thereof, it is to be understood that modifications or variations may be easily made without departing from the spirit of this invention which is defined by the appended claims.

What is claimed is:

1. A light guide and stamper production method, comprising the steps of:

forming a plurality of microstructures on a transparent substrate by etching;

inverse-forming a stamper from said substrate;

making a light guide by plastic molding, hot embossing, rolling or spreading, so that said light guide has a plurality of microstructures that is equal to said plurality of microstructures on said transparent substrate; wherein, after etching said transparent substrate, a light source, a reflector, a diffusion sheet and a prism sheet are added assembled, simulating a back light module for performing a test of luminosity, uniformity of light intensity and light emission angle, allowing adjustment of said plurality of microstructures on said transparent substrate for appropriate sizes and density before proceeding with said inverse-forming of said stamper.

2. A light guide and stamper production method according to claim 1, wherein on a back surface of said transparent substrate a plurality of quadratic, bowl like, oval or semicircular microstructures is formed by isotropic etching.

3. A light guide and stamper production method according to claim 2, wherein said stamper is a rear stamper for forming a back surface of said light guide and has a plurality of quadratic, bowllike, oval or semicircular microstructures formed by isotropic etching and subsequent inverse-forming, wherein the following steps are performed:

a. coating of said substrate with a photoresist layer;

b. light exposure and developing;

c. isotropic etching of said substrate, forming said plurality of microstructures;

d. growing a metal seed layer;

e. generating said rear stamper by electroforming; and f. etching off said seed layer.

4. A light guide and stamper production method according to claim 1, wherein on a front surface of said transparent substrate a plurality of V-shaped, U-shaped or pyramidlike microstructures is formed by anisotropic etching.

5. A light guide and stamper production method according to claim 4, wherein said substrate is a single crystal and said stamper is a front stamper for forming a front surface of said light guide and has a plurality of V-shaped, U-shaped or pyramidlike microstructures formed by anisotropic etching and subsequent inverse-forming, wherein the following steps are performed:

a. placing of a thin etching mask layer on said substrate;

b. coating with a photoresist layer;

c. light exposure and developing;

d. etching of said thin etching mask layer;

e. anisotropic etching of said substrate, forming said plurality of microstructures f. growing a metal seed layer;

g. generating said front stamper by electroforming; and h. etching off said seed layer.

6. A light guide and stamper production method according to claim 1, wherein a front stamper and a rear stamper are used together or separately.

7. A light guide and stamper production method according to claim 3, wherein said seed layer is made of the metals Ni, Cu or Ag.

8. A light guide and stamper production method according to claim 5, wherein said seed layer is made of the metals Ni, Cu or Ag.

9. A light guide and stamper production method according to claim 3, v,herein said rear stamper is made of Ni, NiCo alloy, NiFe alloy or SiC.

10. A light guide and stamper production method according to claim 5, wherein said front stamper is made of Ni, NiCo alloy, NiFe alloy or SIC.

* * * * *